Patented May 19, 1931

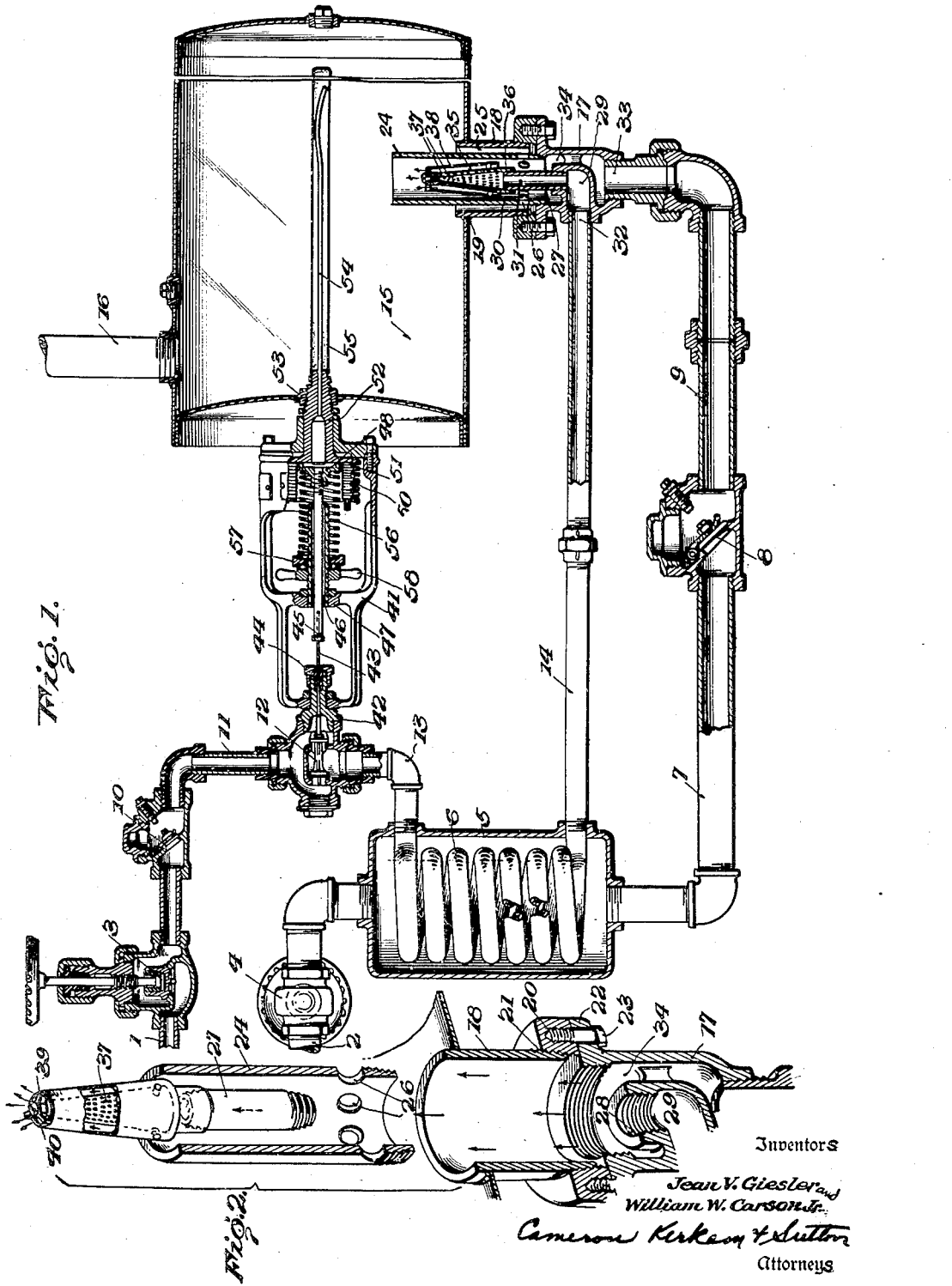

1,806,394

UNITED STATES PATENT OFFICE

JEAN V. GIESLER AND WILLIAM W. CARSON, JR., OF KNOXVILLE, TENNESSEE, ASSIGNORS TO THE FULTON SYLPHON COMPANY, OF KNOXVILLE, TENNESSEE, A CORPORATION OF DELAWARE

FLUID MIXER

Application filed February 11, 1928. Serial No. 253,779.

This invention relates to thermostatically controlled means for heating a fluid by mixing another heated fluid therewith, and more particularly to apparatus of this type for heating water by mixing steam therewith. The invention, while not restricted thereto, is particularly adapted to service in installations of moderate size, where more or less infrequent demands on the apparatus are encountered. In the apparatus of this character heretofore known, it has been difficult to obtain an accurate and evenly regulated temperature due largely to lag of the thermostatic control elements. In the average water heating installation of this character of moderate size, where large storage tanks are impracticable or undesirable for one reason or another, the mixture of the fluids such as water and steam has been accomplished directly in the pipe line conducting the water to the desired points. It has also been proposed to combine with such apparatus a suitable thermostatic control means subjected to the temperature of the heated water in the pipe line and operating a suitable control valve placed usually in the steam supply line. It has been found, however, that the regulation thereby obtained is far from satisfactory. This is due largely to the fact that practically all thermostats have a certain amount of lag and do not respond instantly to heat variations. The water or other fluid, however, being treated in comparatively small quantities during its flow through the mixing device, undergoes temperature variations which are substantially instantaneous. An excess of heating fluid for any reason, such as a variation in the supply pressure, will thus produce a quick substantial rise of the temperature of the fluid to be heated, and yet the supply of the heating fluid will not be diminished for an appreciable interval due to the lag of the thermostatic element. On the other hand, when the thermostatic control means does respond to diminish the supply of heating fluid, or when such supply diminishes for any other reason, the temperature of the fluid to be heated falls practically instantaneously, whereas the supply of heating fluid is not again increased until after the lag of the thermostatic element has been overcome. As a result, the temperature of the heated fluid delivered from the apparatus frequently varies over a wide range between approximate maximum and minimum temperatures, and the desired evenly regulated and accurately controlled temperature is not obtained. The temperature of the water in such cases may readily become so high that serious danger of scalding results before the thermostatic element can act to control the supply of heating fluid.

One of the objects of the present invention is to obviate the above disadvantages and to provide a novel fluid heater of the character described which is capable of evenly and accurately regulating the temperature of the fluids flowing therefrom.

Another object is to provide a thermostatically controlled fluid heater wherein variations of temperature due to lag of the thermostatic element or elements are effectively prevented.

A further object is the provision of a heating system of the character described having means therein whereby overheating, when the flow of fluid therefrom is stopped, will be prevented.

A still further object is to provide a heating system wherein a substantial body of fluid is heated by means of circulation through a heating device which is thermostatically controlled according to the temperature of such body, thereby stabilizing the action of the thermostatic element in response to such variations in the temperature of the fluid to be heated.

A further object is the provision of novel and improved means for mixing a heating fluid such as steam with a fluid to be heated such as water.

Another object is the provision of a novel and improved form of nozzle to be employed in conjunction with a mixer for steam and water or the like.

Other objects will appear hereinafter as the description of the invention proceeds.

With these objects in view, the invention, broadly stated, includes the provision with a suitable mixing device of stabilizing means such as a small tank or other suitable reservoir for accurately controlling the thermostatic element associated with the mixing device. The desired fluids are conducted from any suitable sources to the mixing device, and then to the stabilizing tank, means being preferably provided to establish a continuous circulation from the mixing device to the tank and then back to the mixing device whereby the entire body of water in the stabilizing tank is brought to the desired temperature. The thermostatic control element is subjected to the temperature of the stabilizing tank. The fluid from the mixing device, which is subject to the variations above described, is thus mixed with the larger body of water in the stabilizing tank, and the circulation above described provides for gradually bringing the temperature of the tank to the desired point thus eliminating the sudden variations in temperature of the fluid withdrawn therefrom. Furthermore, the rate of withdrawal of fluid from the tank is sufficiently small compared to the volume of water in the tank that the rate of change of temperature in the latter will not be in excess of the capacity of the thermostatic element to control the supply of heating fluid to the mixing device. It will be understood, however, that while the reservoir may vary somewhat in size, it need be large only in relation to the quantity of water in the mixing device, and does not constitute a storage tank for hot water as that term is understood in the art.

One embodiment of the invention has been illustrated in the accompanying drawings, but it is to be expressly understood that said drawings are for the purposes of illustration only and are not to be construed as defining the limits of the invention, reference being had to the appended claims for this purpose.

In the drawings,

Fig. 1 is a diagrammatic view of a heating system constructed according to the invention; and Fig. 2 is a detail view showing the fluid mixing device.

Referring now to the drawings, wherein like reference numerals indicate like parts, the heating fluid and the fluid to be heated, which are hereinafter referred to for simplicity as steam and water, may be supplied to the apparatus by any suitable means which are represented in the drawings by the pipes 1 and 2 respectively, preferably controlled by suitable stop valves 3 and 4. Preferably, although not necessarily, suitable means are provided for preliminarily heating said water before it reaches the mixing device, and to this end the pipe 2 is shown as connected to a suitable tank 5, which is heated by any suitable means such as the coil 6. The water thus heated is conducted by a pipe 7 to a check valve 8 of any suitable type, and thence by a pipe 9 to a suitable fluid mixing device, preferably of the type described hereinafter.

The steam is preferably conducted by the pipe 1 to a suitable check valve 10, and thence by a pipe 11 to a suitable control valve 12, which is thermostatically controlled preferably by the means described hereinafter. The steam supplied by the pipe 1 may, if desired, be employed to heat the water in the tank 5, and as shown, the steam supply pipe is connected to the coil 6 by means of a pipe 13. From the coil 6, the steam, which may now be partially condensed, is conducted by a pipe 14 to the fluid mixing device. It will be understood, however, that the tank 5 and coil 6 constitute a refinement not necessary in all cases, and where omitted, the water and steam are conducted directly from pipes 2 and 11 respectively to pipes 7 and 14. Valve 12 may also be connected to the pipes 11 and 13 in reversed relation to that illustrated, so that the inlet pressure is admitted to the chamber between the valve seats shown.

The fluid mixing device is preferably of the type wherein water or other fluid is heated by injecting steam or the like therein, and delivers the heated water to a suitable tank or other reservoir 15, from which the water may be withdrawn as required through the pipe 16. Any suitable or desired type of fluid mixer may be employed. Preferably, however, said fluid mixer comprises a plurality of concentric tubular or annular passages, suitably communicating with one another to provide for the desired mixing of the fluid. Steam or other heated fluid may be supplied to one of said passages, and water or other fluid to be heated to another passage, the two fluids flowing through the passages preferably in parallel directions to any suitable point where any suitable means, such as nozzle openings connecting the passages, provide for the mixing of the fluids which are then delivered to the reservoir 15. Still another passage may be and preferably is provided, whereby fluid from the reservoir 15 may be returned to the mixing device, heated, and returned again to the reservoir to establish a continuous circulation therebetween.

Referring now to Fig. 2, wherein is shown by way of example the preferred form of mixing device, the fluid mixer comprises a suitable body member 17, connected with the tank 15 in any suitable manner, as by means of an outer tubular member 18. The member 18 is attached at one end to the wall of the tank in any suitable way, as by welding at 19, and at its other end to the body member 17, preferably by means of a ring 20 threaded at 21 on the end of the member 18, and suitably connected with a flange 22 of the body 17, as by means of bolts or screws 23.

Concentric with said member 18 and within the same, are a plurality of additional tubular members supported in any suitable manner, and constituting with said member a central tubular passage and a plurality of surrounding concentric annular passages. In the form shown, a second tubular member 24, of smaller diameter than the member 18, is threaded into the end of the body 17 and forms a continuation thereof to the reservoir, preferably extending well within the same for a purpose hereinafter described. Between the members 24 and 18 is thus formed an annular passage 25 open at one end into the reservoir and closed at the other end by the flange 22, except for a plurality of openings 26 in the member 24. A third and central tubular member 27 is supported in the mixing device, preferably having threaded engagement at 28 with the walls of a central passage 29 formed in the body 17. Between the member 27 and the member 24 is formed a second annular passage 30, open at both ends and communicating through openings 26 with the passage 25, and within the member 27 is formed a central tubular passage 31, preferably having at its upper end a suitable mixing device such as hereinafter described.

The body 17 is provided with a pair of inlet openings 32 and 33, one of said inlets 32 being suitably connected with the steam supply pipe 14 and communicating with the central body passage 29, and the other of said inlets 33 being suitably connected with the water supply pipe 9 and communicating with an annular passage 34 in the body 17 which surrounds the central passage 29. The water from the supply pipe 9 enters the inlet 33, flows through the annular passage 34 into the annular passage 30, and discharges into the reservoir 15.

During its flow through the passage 30, the water is heated by mixing steam or steam condensate therewith. To this end, the steam from the pipe 14 enters the inlet 32, and flows through the passage 29 and the passage 31 to a suitable device for injecting said steam into the water flowing around said device, which device may, for example, comprise a nozzle of any suitable or desired type. In the form shown, said nozzle is an inverted cone-shaped member, threaded at its base 36 on the end of the member 27. The nozzle member 35 is provided with a plurality of small openings 37, which are preferably disposed in radial planes and at an angle to the axis of the cone as shown in Fig. 1, whereby the steam passing therethrough is injected into the water flowing around the nozzle in the direction of flow of the water. For the purpose of insuring that a thin layer of water shall pass in contact with the nozzle to be heated heated by the steam, and for the further purpose of decreasing the noise which usually results from mixing steam with water, the nozzle 35 may be surrounded by a suitable guard 38, preferably also cone-shaped, and open at both ends. The guard 38 may be supported in any suitable manner, as by means of a spider 39 attached to the inner end of the nozzle 35 by any suitable means such as a screw 40.

As hereinbefore indicated, the supply of steam to the mixing device is thermostatically regulated in accordance with the temperature of the water in the tank 15. Any suitable type of thermostatic control may be employed for this purpose, and in the form shown the valve 12 in the steam supply line is operated by a thermostatic control device of the type shown in the patent to W. M. Fulton, No. 1,591,085. As shown, the said thermostatic device comprises a frame 41 supported at one end on the stuffing box 42 of the body of the valve 12. A valve stem 43 operatively connected with the valve 12 passes through the stuffing box 42 and cap nut 44 and is attached to a rod 45. The rod 45 slides in a guide 46 which is threaded into a supporting member 47 preferably constituting a part of the frame 41. The other end of the rod 45 is attached to the cup-shaped movable head 48 of a thermostat comprising a collapsible and expansible wall 50 attached at one end to the head 48 and at the other end to a stationary head 51. The heads 48 and 51, together with the wall 50 constitute a thermostatic vessel of a type well known in the art. A tubular extension 52 of the head 51 is exteriorly threaded to engage an interiorly threaded collar or nut 53 inserted in a suitable opening in the tank 16 and preferably soldered thereto. A tube 54 communicates with the thermostatic vessel and is located in a bulb 55 adapted to contain the thermostatic fluid and preferably soldered to the end of the extension 52. The bulb 55 is preferably located substantially in the center of reservoir 15. As the pressure of the fluid in the bulb increases or decreases the thermostatic fluid will expand or contract the thermostatic vessel, thereby causing movement of the movable head 48 which carries with it the rod 45, valve stem 43, and valve 12. Movement of the movable head 48 is preferably regulated by a spring 56, bearing at one end against said head and at the other end against a seat 57 cooperating with an adjusting nut 58 threaded on the tubular guide 46.

The operation of the apparatus will be apparent from the foregoing description, and may be stated briefly as follows: Assuming that water is being withdrawn from the tank through outlet 16, and that the valves 3 and 4 are open, water passes through the pipe 2 into the tank 5, where it is heated by steam passing through the pipe 1, check valve 10, control valve 12, and heating coil 6. The water from the tank 5 passes through the check valve 8 and thence to the inlet passage 33 of the mixing device, the annular continuation thereof 34, the passage 30 around the nozzle 35, and into the tank 15. The steam, which may be partially condensed in case the coil 6 is employed, passes through the pipe 14, inlet passages 32 and 29, passage 31, nozzle 35, and openings 37 into the stream of water flowing between the nozzle and the guard 38. Assuming the water in the tank 15 to be cold, so that the control valve 12 is open, the water flowing from the passage 30 into the tank will be at a considerably higher temperature than that in the tank. The heated water from around the nozzle will, therefore, rise into the tank, and the cold water in the bottom of the tank will tend to pass outwardly therefrom through the annular passage 25 and openings 26 into the passage 30, and thence around the nozzle and back to the tank 15. The rate of withdrawal from the tank being small as compared with the volume of water in the tank, the temperature in the tank will gradually though rapidly rise until the desired point is reached, when the thermostatic control element will act to decrease or shut off the supply of steam through the valve 12. If the rate of withdrawal from the tank 15 is such that the temperature within the tank now tends to fall, the control valve 12 will open an amount dependent on the amount of decrease of temperature in the tank, and the thermostat will continue to properly proportion the amount of opening of the valve 12 in accordance with the temperature in the tank. Since the rate of withdrawal of the water through the pipe 16 is in all cases relatively small compared to the volume of water in the tank 15, any change of temperature in the tank 15 will be gradual and will not be so sudden as to exceed the capacity of the thermostatic element to correspondingly regulate the valve 12. In other words, sudden changes in the temperature in the tank 15 will be avoided, to which the thermostatic control element would not quickly respond, and an evenly and accurately regulated temperature in the flow from the pipe 16 will therefore be obtained.

The pressure of the steam admitted to the mixing device is normally higher than the pressure of the water admitted thereto, as is necessarily the case for purposes of injection of the steam into the water. If for any reason the steam pressure should fall below that of the water, the check valve 10 in the steam supply line prevents the water from backing up in the steam line. Likewise the check valve 8 in the water supply line prevents the steam from backing up in said line when the outlet 16 is closed. The arrangement of check valves shown has the further important advantage of automatically stopping the flow of steam to the heating device when the outlet 16 is closed and no water is being withdrawn from the tank 15. This is due to the fact that as soon as the outlet 16 is closed, the pressure in the tank 15 and in the water line as far as the check valve 8 immediately builds up to the pressure of the inlet steam. As soon as these pressures are equalized, no more steam can flow through the nozzle 35 and all danger of overheating the fluid in the tank is effectively eliminated. At the same time, as soon as the pressure in the tank 15 is relieved by opening the outlet 16, steam will at once flow into the fluid mixer at a rate governed by the position of the valve, which in turn is controlled by the temperature of the water in the tank 15 as influenced by the rate of outflow.

It will thus be perceived that the apparatus functions as an instantaneous fluid heater, wherein heating of the fluid begins automatically when the discharge is opened and stops automatically when the discharge is closed. In other words, while the discharge is closed, as explained above, no steam can flow into the mixing device because of the equalization of the pressure in the system with the steam supply pressure. On the other hand, as soon as the discharge is opened, the pressure in the system is immediately relieved and steam at once commences to flow into the mixing device, continuing until the discharge is again closed. The operation of the thermostat is to position the control valve 12 so as to properly proportion the amount of the steam flowing into the mixer to the rate of withdrawal of water from the tank, and thus to obtain an evenly regulated discharge temperature as explained above, whereas in practice the actual admission of steam to the mixer and the shutting off of the supply are governed by the discharge from the apparatus.

One of the purposes of the baffle or guard 38 for the nozzle 35, as previously indicated, is to decrease the noise usually encountered in mixing steam with water. Said guard may not be necessary in all cases. For example, when the embodiment shown in the drawing is running at a low proportion of its total capacity, the steam will be totally condensed when passing through the coil 6 and the function of the guard will not be required. On the other hand, if the apparatus is operating at a comparatively high proportion of its total capacity, the surface of the heating coil 6 may not be sufficient to condense all the steam, and some noise would be incurred in mixing the uncondensed steam with the water. In this latter case the nozzle should be provided with a suitable guard as shown in order to eliminate this noise. However, the surface of the coil 6 may be made large enough to condense all of the steam at the total capacity of the apparatus, in which case the guard would not be necessary. In other words, by employing the tank 5 and coil 6, and by properly proportioning the surface of the coil with respect to the amount of steam required, the mixture may be made entirely noiseless. If for any reason this result is not accomplished by the tank 5 and coil 6, the guard or baffle 38 may be combined with the nozzle in order to prevent noise, thus enabling the use of a smaller coil 6 and tank 5. The disposition of the holes 37 in the nozzle and their relation to the baffle 38 aid both in reducing the noise and facilitating the flow of the water through the passage 30 and between the guards and the nozzle.

It will therefore be perceived that the present invention avoids the necessity for a storage tank while at the same time it eliminates the disadvantages and dangerous conditions incident to prior structures for heating water and other liquids by direct intermixture therewith of the heating medium, such as steam. By maintaining the proper relation between the volume of water in the stabilizing tank or receptacle and the lag of the thermostat, the receptacle may be made relatively small while substantial fluctuation of temperature is eliminated because the capacity of the volume of water in the receptacle to change temperature is on the same order as the capacity of the thermostat to respond to the changes of temperature.

While only one embodiment of the invention has been described and illustrated, for purposes of exemplification, it will now be readily apparent to those skilled in the art that other embodiments may be made and that changes may be made in the construction and arrangement of the parts without departing from the spirit of the invention. While the embodiment illustrated includes the tank 5 and coil 6, it is to be expressly understood that the invention may be used without the interposition of these elements, in which case the entire heating of the water will take place in the fluid mixer heretofore described. This embodiment of the invention is available where the noise of injecting steam into water is not objectionable, and possesses the advantage of greater simplicity and less consumption of space. Reference is therefore to be had to the appended claims for a definition of the limits of the invention.

What is claimed is:

1. In apparatus of the class described, the combination of a stabilizing receptacle, a device for mixing a heating fluid with a liquid to be heated and delivering the mixture to said stabilizing receptacle, said receptacle having a volume which is relatively large as compared with the volumes of the fluid being mixed at any one time, and thermostatic control means subjected to the temperature of the mixture within said stabilizing receptacle to control the supply of said heating fluid.

2. In apparatus of the class described, the combination of a stabilizing receptacle, a device for mixing a heating fluid with a liquid to be heated, means connecting said device with said stabilizing receptacle and adapted to cause circulation from the receptacle to the device and then to the receptacle, and thermostatic control means subjected to the temperature within said stabilizing receptacle to control the supply of said heating fluid.

3. In apparatus of the class described, the combination of a stabilizing receptacle, a device for mixing a heating fluid with a fluid to be heated, means supplying fluids to said device, means conducting mixed fluids to said stabilizing receptacle, means providing a return circulation from the receptacle to said device, thermostatic control means subjected to the temperature within said stabilizing receptacle to control the supply of heating fluid, and means for discharging fluid from said receptacle.

4. In apparatus of the class described, the combination of a stabilizing receptacle, preheating means for heating a fluid by heat supplied from a second fluid, a device operatively connected with said means for mixing said fluids, means operatively connecting said device with said stabilizing receptacle, thermostatic control means subjected to the temperature within said stabilizing receptacle for controlling the supply of said second fluid, and means for discharging fluid from said stabilizing receptacle.

5. In apparatus of the class described, the combination of a stabilizing receptacle, means for heating a fluid by heat supplied from a second fluid, a device operatively connected with said means for mixing said fluid, means operatively connecting said device with said stabilizing receptacle and adapted to cause circulation from the receptacle to the device and then to the receptacle, thermostatic control means subjected to the temperature within said stabilizing receptacle for controlling the supply of said second fluid, and means for discharging fluid from said stabilizing receptacle.

6. In apparatus of the class described, the combination of a stabilizing receptacle, means for heating a fluid by heat supplied from a second fluid, a device operatively connected with said means for mixing said fluids, means conducting mixed fluids to said stabilizing receptacle, means providing a return circulation from said receptacle to said device, thermostatic control means subjected to the temperature within said stabilizing receptacle for controlling the supply of said second fluid, and means for discharging fluid from said stabilizing receptacle.

7. In apparatus of the class described, the combination of a stabilizing receptacle having a volume which is relatively large as compared with the volumes of fluid being mixed at any one time, a device for mixing a heating fluid with a fluid to be heated and delivering mixed fluids to said stabilizing receptacle, supply lines for conducting said fluids to said device, and a one-way valve in each of said supply lines.

8. In apparatus of the class described, the combination of a stabilizing receptacle, a device for mixing a heating fluid with a fluid to be heated, means connecting said device with said stabilizing receptacle, supply lines for conducting fluids to said device, thermostatic control means subjected to the temperature within said stabilizing receptacle and occupying only a relatively small portion of the volume of said receptacle to control the supply of said heating fluid, and a check valve in each of said supply lines.

9. In combination with a fluid mixing device of the type wherein hot and cold fluids are caused to flow continuously therethrough whereby the fluids are mixed in relatively small quantities, a stabilizing reservoir for said mixed fluids having a volume large as compared with said quantities and thermostatic control means subjected to the temperature within said stabilizing reservoir and controlling the supply of hot fluid to said device.

10. In a fluid heating system of the type wherein hot and cold fluids are conducted through a mixing device to a discharge means whereby relatively small quantities of fluid are continuously heated, the combination with said system of a stabilizing reservoir interposed between said mixing device and discharge having a volume which is large as compared with the flow through said device and a thermostatically controlled valve subjected to the temperature within said stabilizing reservoir and controlling the supply of hot fluid to said device.

11. In a fluid heating system of the type wherein hot and cold fluids are conducted through a mixing device to a discharge whereby relatively small quantities of fluid are heated during flow, the combination with said system of a stabilizing reservoir interposed between said device and said discharge and having a volume which is large as compared with the flow through said device, means providing return circulation between said stabilizing reservoir and said device, and thermostatic valve control means subjected to the temperature within said stabilizing reservoir and controlling the supply of hot fluid to said device.

12. Apparatus of the class described comprising in combination a steam supply line, a control valve therein, a water supply line, a device operatively connected to said lines for mixing said steam and water, a stabilizing reservoir operatively connected with said device and having a volume which is relatively large as compared with the volumes of fluid being mixed at any one time, and thermostatic means operatively connected with said valve and subjected to the temperature within said stabilizing reservoir.

13. Apparatus of the class described comprising in combination a steam supply line, a control valve therein, a water supply line, a device operatively connected to said lines for mixing said steam and water, a stabilizing reservoir operatively connected with said device, a return conduit connecting said stabilizing reservoir and device, and thermostatic means operatively connected with said control valve and subjected to the temperature within said stabilizing reservoir.

14. Apparatus of the class described comprising in combination a steam supply line, a water supply line, a check valve in each line, a control valve in said steam supply line, a device operatively connected with said lines for mixing said steam and water, a stabilizing reservoir operatively connected with said device, a return conduit from said stabilizing reservoir to said device, and thermostatic means subjected to the temperature within said reservoir and operatively connected with said control valve.

15. Apparatus of the class described comprising in combination a steam supply line, a control valve therein, a water supply line, a tank in said water line, a heating coil in said tank connected with said steam line, a steam and water mixer operatively connected with said coil and tank, a stabilizing reservoir connected with said mixer, and thermostatic means subjected to the temperature of said stabilizing reservoir and operatively connected with said valve.

16. Apparatus of the class described comprising in combination a steam supply line, a control valve therein, a water supply line, a tank in said water line, a heating coil in said tank connected with said steam line, a steam and water mixer operatively connected with said coil and tank, a stabilizing reservoir connected with said mixer, a return conduit from said stabilizing reservoir to said mixer, and thermostatic means subjected to the temperature of said stabilizing reservoir and operatively connected with said valve.

17. Apparatus of the class described comprising in combination a steam supply line, a check valve therein, a control valve therein, a water tank, a heating coil therein connected to said steam line, a steam and water mixer, water and steam conduits connecting said mixer with said tank and coil, a check valve in said water conduit, a stabilizing reservoir operatively connected with said mixer, and thermostatic means operatively connected with said control valve, and subjected to the temperature of said stabilizing reservoir.

18. In apparatus of the class described, the combination of a fluid mixing device having a plurality of concentric passages, one of said passages terminating in a second passage, means conducting hot and cold fluids to said passages, and a reservoir, said second passage terminating within said reservoir and a third of said passages connecting said reservoir with said second passage.

19. In apparatus of the class described, the combination of a fluid mixing device having a plurality of concentric passages, means conducting hot and cold fluids thereto, one of said passages terminating within a second passage to mix said fluids, and a reservoir, said second passage terminating within said reservoir and a third of said passages connecting said reservoir with said second passage outwardly of the termination therein of said first passage.

20. In apparatus of the class described, the combination of a fluid mixing device having a plurality of concentric passages, means conducting hot and cold fluids to respective passages therein, the hot fluid passage terminating in the cold fluid passage to mix the fluids, a reservoir, said cold fluid passage discharging within said reservoir, and a third of said passages connecting said reservoir to said cold fluid passage outwardly of the termination therein of said hot fluid passage.

21. In apparatus of the class described, the combination of a fluid mixing device having a plurality of concentric passages, means conducting hot fluid to the inner of said passages and cold fluid to an intermediate passage, said inner passage terminating in said intermediate passage to mix the fluids, and a reservoir said intermediate passage discharging into said reservoir and the outer of said passages connecting said reservoir with said intermediate passage outwardly of the termination therein of said inner passage.

22. In apparatus of the class described, the combination of a fluid mixing device having three tubular members forming concentric passages, a reservoir, the intermediate tubular member extending within said reservoir, the inner tubular member terminating in said intermediate member and having nozzle means at its end, and the outer tubular member extending outwardly from said reservoir past said nozzle means and communicating with the passage within said intermediate member, and means conducting a hot fluid to the passage within said inner member and cold fluid to the passage within said intermediate member.

23. In apparatus of the class described, the combination of a body member having a central passage and a concentric annular passage, a reservoir, a tubular member extending said annular passage within said reservoir, a nozzle within said tubular member, means connecting said nozzle with said central passage, an outer tubular member spaced from said first-named tubular member and connected with said reservoir, said first-named tubular member having openings between said nozzle and said body member, means conducting steam to said central passage, and means conducting water to said annular passage.

24. In apparatus of the class described, the combination of a body member having a central passage and an annular surrounding passage, a reservoir having an opening therein, a tubular member extending from said annular passage through said opening, a nozzle within said tubular member, a pipe connecting said nozzle with said central passage, an outer tubular member carried by said body member and spaced from said first-named tubular member to form an outer annular passage, said outer tubular member extending to said opening, said inner tubular member having openings adjacent said body member whereby said outer annular passage and inner annular passage are in communication, means conducting steam to said central passage, and means conducting water to said annular surrounding passage.

25. In a fluid mixer, a fluid passage, a nozzle associated with said passage and having a plurality of openings distributed both axially and circumferentially of said nozzle, a second fluid passage surrounding said nozzle, and an imperforate baffle surrounding and spaced from said nozzle.

26. In a fluid mixer, a hollow substantially conical nozzle having openings through its walls distributed both circumferentially and axially thereof, a conduit delivering fluid to said nozzle, a fluid passage surrounding said nozzle, and a baffle surrounding and and spaced from said nozzle and open at both ends.

27. In a fluid mixer, a hollow substantially conical nozzle, means delivering fluid to the interior thereof, said nozzle having an opening through its wall at an angle to the axis of the cone, a fluid passage surrounding said nozzle, and a substantially conical baffle surrounding and spaced from said nozzle.

28. In a fluid mixer, a hollow conical nozzle, means delivering fluid thereto, a fluid passage surrounding said nozzle, said nozzle having a plurality of openings each at an acute angle to the axis of the cone and extending in the direction of flow of fluid in said passage, and a frusto-conical baffle in said passage surrounding and spaced from said nozzle.

29. A fluid nozzle comprising a hollow cone-shaped body adapted to receive fluid at its base and having a plurality of openings through the wall thereof, said openings being at an acute angle to the axis of the cone and an imperforate conical baffle surrounding said body.

30. A fluid nozzle comprising a hollow cone-shaped body adapted to receive fluid at its base and having a plurality of openings through the wall thereof, said openings lying in radial planes at an acute angle to the axis of the cone measured from the tip thereof, and a baffle approximately parallel to and spaced from the nozzle openings.

31. The combination with a hollow conical member having a plurality of nozzle openings therethrough, of a frusto-conical baffle member surrounding and spaced approximately evenly from said conical member and open at both ends.

32. A heating system automatically operative to heat fluid when fluid is withdrawn from said system comprising the combination of a mixer for hot and cold fluids, a reservoir operatively connected with said mixer to receive mixed fluids therefrom, fluid discharge means for said reservoir, and means controlling the admission of hot fluids to said mixer in accordance with the discharge from said reservoir.

33. An automatic heating system comprising in combination pressure supply means for heating fluid, a fluid supply and heating system normally closed to escape of fluids therefrom and normally in open communication with said pressure supply means, and discharge means for said system whereby when said discharge means is opened the pressure within said normally closed system is substantially instantaneously relieved to permit said heating fluid to flow into the system.

34. A heating system automatically operative to heat fluid when fluid is withdrawn therefrom comprising in combination pressure supply means for a heating fluid, a fluid supply and heating system including a fluid mixing device and means for supplying cold fluid thereto, said system being normally closed to the escape of fluids therefrom and in open communication with said pressure supply means, and discharge means for said system whereby when said discharge means is open the pressure within said normally closed system is relieved and said heating fluid flows into the mixing device.

35. A heating system operative to heat fluid when fluid is withdrawn therefrom comprising in combination a fluid system including a fluid mixer and a normally closed reservoir connected therewith, means for supplying heating fluid under pressure to said mixer, means for supplying cold fluid to said mixer, one-way control means for said last-named means whereby said mixer, reservoir and cold fluid supply means constitute a closed pressure chamber wherein said heating fluid supply means terminates in open communication therewith, and discharge means for said reservoir whereby when said last-named means is opened the pressure within said closed pressure chamber is relieved and heating fluid flows into the system.

36. A pressure controlled heating system operative to heat fluid when fluid is withdrawn therefrom comprising in combination one-way supply means for hot and cold fluids, a fluid mixer connected with said means, a reservoir normally closed except for communication with said mixer, said reservoir, mixer and one-way cold fluid supply means constituting a closed pressure system to which said hot fluid supply means is in open communication, and a discharge means for said reservoir operative to relieve the pressure in said closed system whereby hot fluid flows through said mixer.

37. A heating system automatically operative to heat fluid when fluid is withdrawn from said system comprising the combination of a mixer for hot and cold fluids, a reservoir operatively connected with said mixer to receive mixed fluids therefrom, fluid discharge means for said reservoir, means in open communication with said mixer for admitting hot fluid to said mixer in accordance with the discharge from said reservoir, and thermostatic control means subjected to the temperature within said reservoir to proportion, the amount of hot fluid admitted in accordance with said temperature.

38. An automatic heating system comprising in combination pressure supply means for a heating fluid, a fluid supply and heating system normally closed to the escape of fluid therefrom and normally in open communication with said pressure supply means, discharge means for said system whereby the pressure within the same may be relieved to permit said heating fluid to flow into said system, and thermostatic control means to proportion the amount of heating fluid in accordance with the temperature of said discharged fluid.

39. A heating system automatically operative to heat fluid when fluid is withdrawn therefrom comprising in combination pressure supply means for a heating fluid, a fluid supply and heating system including a fluid mixing device, and means for supplying cold fluid thereto, said system being normally closed to the escape of fluid therefrom and in open communication with said pressure supply means, discharge means for said system whereby the pressure therein is relieved and said heating fluid flows into the same, and thermostatic control means subjected to the temperature within said system to proportion the amount of heating fluid flowing thereinto to the rate of withdrawal of the fluid discharged therefrom.

40. A heating system operative to heat fluid when fluid is withdrawn therefrom comprising in combination a fluid system including a fluid mixer and a normally closed reservoir connected therewith, means supplying heating fluid under pressure to said mixer, means supplying cold fluid to said mixer, one-way control means for said last-named means whereby said mixer, reservoir and cold fluid supply means constitute a closed pressure system wherein said heating fluid supply means terminates in open comunication therewith, discharge means for said reservoir whereby the pressure within said closed system is relieved and heating fluid flows to said mixer, and thermostatic control means subjected to the temperature within said reservoir and proportioning the amount of heating fluid flowing to said mixer to the rate of withdrawal of the fluid discharged from said reservoir.

41. A pressure-controlled heating system automatically operative to heat fluid when fluid is withdrawn therefrom comprising in combination one-way supply means for hot and cold fluids, a fluid mixer connected with said means, a reservoir normally closed except for communication with said mixer, said reservoir, mixer and one-way cold fluid supply means constituting a closed pressure system to which said hot fluid supply means is in open communication, a discharge means for said reservoir operative to relieve the pressure in said closed system whereby hot fluid flows through said mixing device, and thermostatic control means subjected to the temperature within said reservoir and proportioning the amount of hot fluid flowing through said mixer to the rate of withdrawal of fluid from said reservoir to maintain an even temperature of discharge.

42. In a heating system automatically operative to heat fluid when fluid is withdrawn from said system, the combination of a mixer for hot and cold fluids, a stabilizing reservoir into which said mixer delivers, discharge means leading from said reservoir, means controlling the admission of hot fluid, and a thermostat operatively connected to said last-named means and subjected to the temperature of the mixture in said reservoir, said reservoir having such a volume that the capacity of the mixture to change temperature under the action of said mixer as fluid is withdrawn from said reservoir is on the same order as the capacity of the thermostat to respond to changes of temperature in said mixture.

In testimony whereof we have signed this specification.

JEAN V. GIESLER.
WILLIAM W. CARSON, Jr.